Sept. 9, 1952  K. WILLIAMS  2,610,053
FRICTION SHOCK ABSORBER

Filed Nov. 20, 1948  2 SHEETS—SHEET 1

Inventor:
Keith Williams.
By George D. Haight
Atty.

Sept. 9, 1952  K. WILLIAMS  2,610,053
FRICTION SHOCK ABSORBER
Filed Nov. 20, 1948  2 SHEETS—SHEET 2

Inventor:
Keith Williams.
By George D. Haight
Atty.

Patented Sept. 9, 1952

2,610,053

UNITED STATES PATENT OFFICE 2,610,053

FRICTION SHOCK ABSORBER

Keith Williams, Buffalo, N. Y.

Application November 20, 1948, Serial No. 61,190

5 Claims. (Cl. 267—9)

This invention relates to improvements in friction shock absorbers, especially adapted for use in connection with railway car truck springs for snubbing the action of the latter.

One object of the invention is to provide a simple and efficient friction shock absorber, adapted to be substituted for one or more of the spring units of a cluster of truck springs of a railway car, comprising a friction casing, a friction post telescoped within the casing, and spring means opposing relative sliding movement of the post and casing toward each other, wherein the spring means also serves to force the post and casing into tight frictional contact with each other.

Other objects of the invention will more clearly appear from the description and claims hereinafter following.

Figure 1:
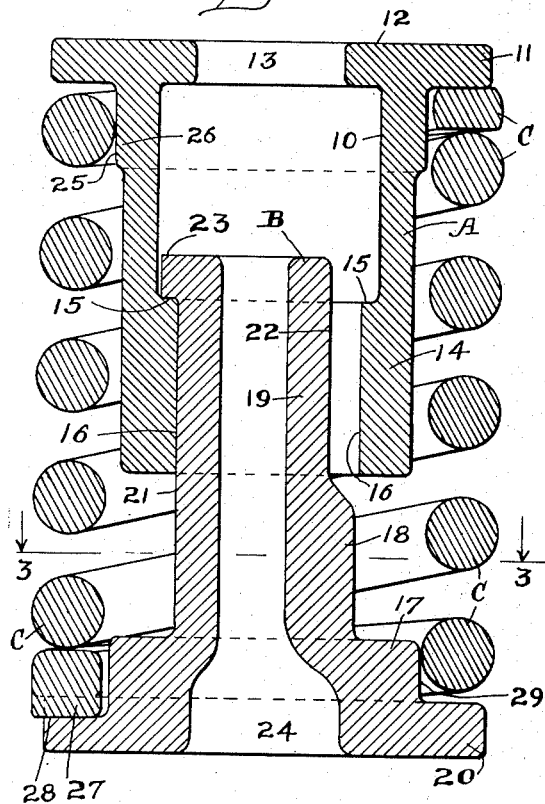
Figure 2:
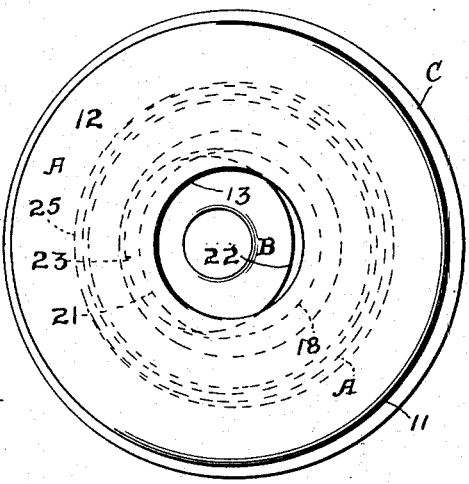
Figure 4:
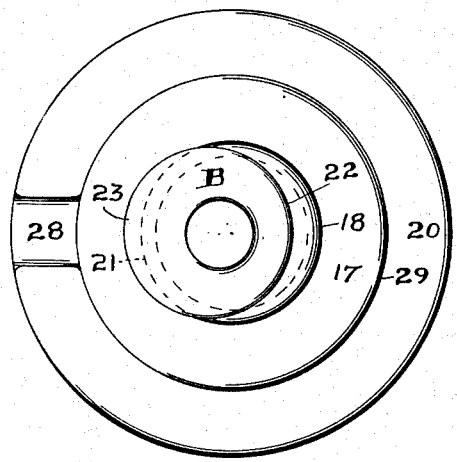
Figure 3:
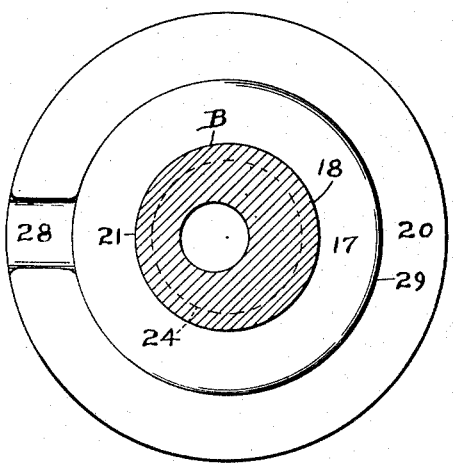
Figure 5:
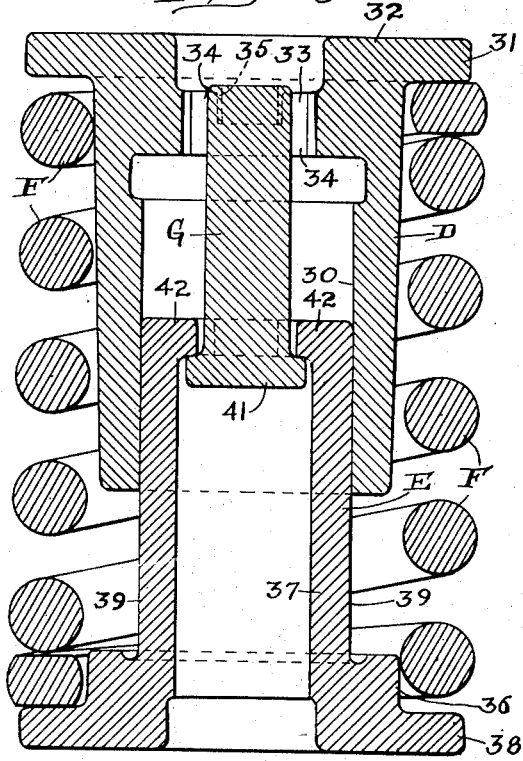
Figure 6:
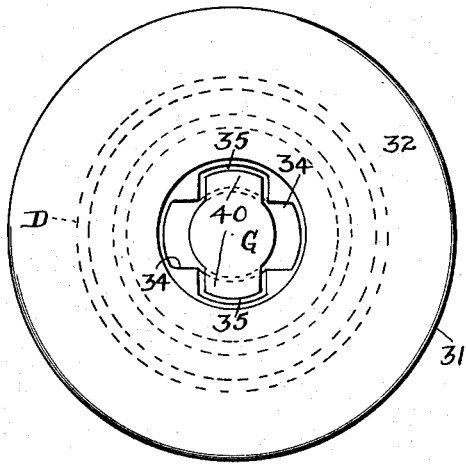
Figure 7:
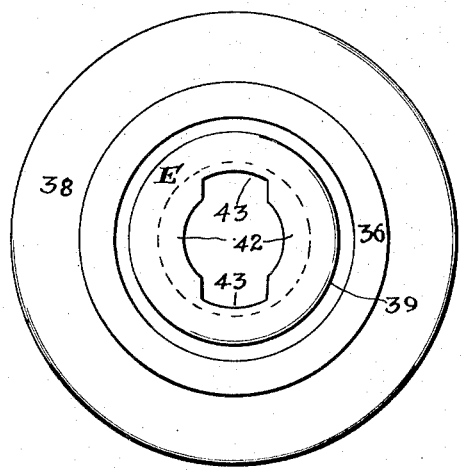
Figure 8:
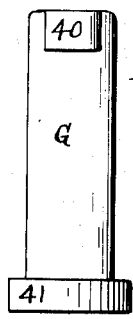
Figure 9:
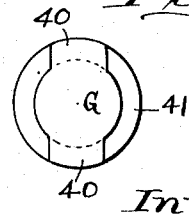

In the accompanying drawings forming a part of this specification, Figure 1 is a transverse vertical sectional view of the improved friction shock absorber. Figure 2 is a top plan view of Figure 1. Figure 3 is a horizontal sectional view, corresponding substantially to the line 3—3 of Figure 1. Figure 4 is a top plan view of the friction post shown in Figure 1. Figure 5 is a view similar to Figure 1, illustrating another embodiment of the invention. Figure 6 is a top plan view of Figure 5. Figure 7 is a top plan view of the friction post shown in Figure 5. Figure 8 is a side elevational view of the retaining element shown in Figure 5. Figure 9 is a top plan view of Figure 8.

Referring first to the embodiment of the invention illustrated in Figures 1 to 4 inclusive, my improved friction shock absorber, as shown in these figures of the drawings, comprises broadly a friction casing A, a hollow friction post B, and a spring C.

The friction casing A is illustrated as disposed at the upper end of the device and comprises a hollow, substantially cylindrical shell 10 having a laterally outwardly projecting, annular follower flange 11 at its upper end. The upper end of the shell 10 is partly closed by a transverse top wall 12, having a central opening 13 therethrough, adapted to receive the usual spring centering projection on the top follower plate, not shown, of a cluster of truck springs. The shell 10 of the casing is open at its lower end and has the side wall thereof inwardly thickened, as indicated at 14. The inwardly thickened portion 14 provides an annular stop shoulder 15 inwardly of the open end of the shell with which the post B cooperates. The interior surface of the shell, at the thickened portion thereof, provides a cylindrical friction surface 16.

The friction post B, as shown in Figure 1, is disposed at the lower end of the device and comprises a cylindrical base portion 17, a cylindrical section 18 upstanding from said base portion and concentric therewith, an upstanding end section 19 of reduced size in transverse section, upstanding from the section 18, and a laterally outwardly projecting, annular follower flange 20 at the bottom end of the base portion 17. The reduced upper end section 19 has the outer surface at the side thereof transversely curved and in vertical alignment with the outer surface of the section 18 at the corresponding side of the device, and forms, with said last named surface, a lengthwise extending, transversely curved friction surface 21, extending the entire length of the post and engaged with the friction surface 16 of the casing A. At the opposite side, the section 19 of the post B is cut away, as indicated at 22 in Figures 1 and 4. At the upper end of the section 19 of the post B is a laterally projecting, outwardly extending stop lug 23 in the form of an arcuate flange overhanging the shoulder 15 of the casing A at the corresponding side of the mechanism. The post B is preferably hollow, and has the opening thereof enlarged at its lower end, as indicated at 24, to accommodate the usual spring centering projection of the lower spring follower plate, not shown, of the cluster of truck springs. The friction post B is telescoped within the casing A and has the friction surface 21 thereof in sliding engagement with the surface 16 of the casing.

The spring C, which is in the form of a helical coil, surrounds the casing A and the post B and has its top and bottom ends bearing on the flange 11 of the casing and the flange 20 of the post B. The inner sides of the top and bottom coils of the spring C at the opposite sides of the mechanism bear on the outer side of the base portion of the casing A, and the outer side of the base portion 17 of the post B, that is, the inner side of the coil at the upper end of the spring at the left hand side of the mechanism, as seen in Figure 1, bears on the vertical face 25 of an outwardly enlarged portion 26 at the upper end of the casing A, and the inner side of the coil at the lower end of the spring, at the right hand side of the mechanism, bears on the vertical face 29 of the base portion 17 of the post, the spring being slightly distorted to exert pressure on these faces of the casing A and post B to hold the friction surfaces of these parts in tight frictional contact with each other. As will be evident, the spring thus urges the post B toward the left, as seen in Figure 1, to hold the lug 23 engaged over the stop shoulder 15 of the casing. To hold the spring C against rotary displacement, the bottom tank is provided with a depending locking lug 27 engaged in an upwardly opening radial seat 28 in the flange 20 of the post B. The spring C is under canting tension in the assembled condition of the mechanism to forcibly maintain the friction surfaces of the post and casing in tight contact with each other. This spring as manufactured and before assembly with the post and casing has the axis about which it is coiled inclined with respect to the vertical axis of the base of the spring. In other words, the spring is formed so that it leans to one side when stood on its base and tends to return to its leaning or inclined position when forcibly righted by flexing the same to upright position.

The improved shock absorber preferably replaces one or more of the spring units of a truck spring cluster, being interposed between the usual top and bottom plates of the cluster. In the applied condition of the shock absorber, the same is normally under a certain amount of initial compression, due to the weight of the body of the car thereon.

The operation of the improved shock absorber illustrated in Figures 1 to 4, inclusive, is as follows: Upon the spring cluster of a truck of a railway car being compressed between the spring follower plates of the cluster, the friction shock absorber unit, which is disposed between said follower plates, is compressed therewith, forcing the casing A downwardly toward the post B, against the resistance of the spring C, the friction surface 16 of the casing sliding on the friction surface 21 of the post to develop the required frictional resistance to snub the action of the truck springs. Downward movement of the casing A and compression of the mechanism is finally limited by the lower end of the casing being seated on the base 17 of the post. Upon release of the mechanism, due to the recoil action of the truck springs, the casing A and the post B are returned to the normal positions shown in Figure 1 by the expansive action of the spring C, upward movement of the casing A being limited by engagement of the stop shoulder 15 thereof with the lug 23 of the post.

Referring next to the embodiment of the invention illustrated in Figures 5, 6, 7, 8 and 9, the improved shock absorber shown comprises broadly a friction casing D, a hollow friction post E, a spring F, and a retaining element G.

The friction casing D, as shown in Figure 5, is disposed at the upper end of the mechanism and comprises a hollow, substantially cylindrical shell having an interior friction surface 30 extending lengthwise thereof, and a laterally outwardly projecting, annular flange 31 at its upper end forming a follower member. The upper end of the casing D is partly closed by a transverse top wall 32 having a central opening 33 therethrough. The opening 33 is substantially circular at its upper end to accommodate the usual spring centering projection on the top spring follower plate, not shown, of the truck spring cluster. At the lower end, the opening 33 is of reduced size. The reduced portion of the opening is transversely enlarged to provide a slotlike formation 34. At opposite sides of the slot 34, the bottom wall of the upper larger portion of the opening 33 is provided with diametrically opposite, aligned seats 35—35 adapted to receive the locking lugs 40—40 hereinafter described of the retaining element G.

The friction post E is disposed at the lower end of the device and comprises a cylindrical base portion 36, a hollow cylindrical section 37 upstanding from said base portion and concentric therewith, and a laterally outwardly projecting, annular follower flange 38 at the lower end of the base portion 36. The cylindrical base portion 36 has a sliding telescopic fit within the casing D and presents a lengthwise extending cylindrical friction surface 39 on its outer side slidingly engaged with the friction surface 30 of the casing.

The spring F, which is in the form of a helical coil, surrounds the casing D and post E and has the top and bottom ends bearing on the follower flange 31 of the casing and the flange 38 of the post. As shown in Figure 5, the inner side of the top coil of the spring bears on the outer side of the casing D below the flange 31 of the casing at the left hand side of the mechanism, and the inner side of the bottom coil bears on the outer side of the base 36 of the post E at the right hand side of the mechanism. The spring F is slightly distorted to exert pressure on these parts of the casing D and the post E to hold the friction surfaces thereof in tight frictional contact with each other at the left hand side of the mechanism, as shown in Figure 5.

The retaining element G is in the form of a cylindrical rod, having the lugs 40—40, hereinbefore referred to, at its upper end, which are radially disposed and are of a size to pass freely through the slot 34 of the casing D when turned into alignment with said slot. The lugs 40—40 are adapted to be engaged within the seats 35—35 when the element G is turned to align the same with said seats and thus lock the retaining element against rotation. At the lower end thereof, the element G is provided with an annular flange or head 41 engageable beneath a projecting, inturned flange 42 at the upper end of the hollow post E. The flange 42 is cut out at diametrically opposite sides, as indicated at 43—43, to provide, in effect, a slot to permit passage of the lugs 40—40 of the element G in applying the latter. In applying the element G, the same is inserted upwardly through the post E with the lugs 40—40 aligned with the notches 43—43 of the flange 42 to pass therethrough. After the lugs 40—40 have been passed through the notches 43—43, the element G is given a quarter turn to align the lugs 40—40 with the slot 34 of the casing D. The element G is then pushed upwardly to bring the lugs 40—40 above the seats 35—35 and is turned to align the lugs with these seats. After the lugs have been thus aligned, the element G is dropped to engage the lugs in the seats and lock the parts together. As will be evident, the element G thus serves to lock the parts of the mechanism in assembled condition and limit relative lengthwise separation of the casing D and the post E by engagement of the head 41 with the flange 42 of the post.

The operation of the mechanism shown in Figures 5 to 9 inclusive is substantially the same as the hereinbefore described operation of the mechanism shown in Figures 1 to 4 inclusive.

I claim:

1. In a friction shock absorbing mechanism, the combination with upper and lower spring follower plates; of a hollow friction casing of cylindrical, interior cross section depending from said upper follower plate; a cylindrical friction post upstanding from said lower follower plate, said post being slidingly telescoped within said casing; and a coil spring surrounding said casing and post and bearing at its top and bottom ends on said follower plates, said spring being distorted and having lateral bearing engagement at one end on its inner side with the outer side of the casing at one side of the mechanism, and lateral bearing engagement on its inner side with the outer side of the post at the opposite side of the mechanism.

2. In a friction shock absorbing mechanism, the combination with a friction casing of cylindrical interior cross section presenting a lengthwise extending, interior friction surface; of a cylindrical friction post slidingly telescoped within the casing, said post having frictional sliding engagement with the friction surface of the casing; and a spring surrounding and bearing against said post and casing and yieldingly opposing lengthwise movement thereof toward each other, interior portions of said spring bearing on said casing and post at respectively opposite sides of the mechanism to press said casing and post laterally in opposite directions.

3. In a friction shock absorbing mechanism, the combination with a tubular friction casing having an interior lengthwise extending cylindrical surface; of a friction post having an arcuate lengthwise extending surface the radius of which is substantially the same as that of said cylindrical surface, said friction post being telescoped within said casing with its arcuate surface in sliding engagement with said cylindrical surface and its corresponding remaining surface spaced therefrom; the engaging surfaces of said casing and post being parallel to the longitudinal axis of the same along which they are relatively movable whereby no sidewise movement thereof takes place, and a lengthwise extending, helical coil spring surrounding said casing and post, said spring having the inner side of the coil at one end thereof bearing on the outer side of said casing at one side of the mechanism and the inner side of the coil at the opposite end bearing against said post at the opposite side of the mechanism and being prestressed to bias said surfaces into frictional engagement before any longitudinal movement of said casing and post toward each other takes place, said spring having shouldered engagement with said casing and post to yieldingly oppose relative lengthwise movement of said casing and post toward each other.

4. In a friction shock absorbing mechanism, the combination with a tubular friction casing; of a friction post slidingly telescoped within said casing, said casing having a lengthwise extending, interior cylindrical friction surface and said friction post having an arcuate lengthwise extending friction surface slidingly engaged therewith; the engaging surfaces of said casing and post being parallel to the longitudinal axis of the same along which they are relatively movable whereby no sidewise movement thereof takes place, end followers integral with the outer end portions of said casing end post; and a coil spring surrounding said casing and post and bearing at opposite ends on said followers, said spring having lateral bearing engagement at one end with the outer side of the casing at one side of the mechanism and lateral bearing engagement at its other end with the outer side of the post at the opposite side of the mechanism and being prestressed to bias said surfaces into frictional engagement before any longitudinal movement of said casing and post toward each other takes place.

5. In a friction shock absorbing mechanism, in combination, a tubular friction casing having a radially inwardly extending shoulder, a friction post having a radially outwardly extending shoulder slidingly telescoped within said casing, said shoulders engaging to prevent endwise separation of said casing and post, said casing having a cylindrical friction surface and said friction post having an arcuate lengthwise extending friction surface slidingly engaged therewith the radius of which is substantially the same as that of said cylindrical surface, the remaining surface of said friction post corresponding to said arcuate surface being spaced from said cylindrical surface, the engaging surfaces of said casing and post being parallel to the longitudinal axis of the same along which they are relatively movable whereby no sidewise movement thereof takes place, and a coil spring surrounding and bearing against said casing and post and yieldingly opposing lengthwise movement thereof toward each other and being prestressed to bias said surfaces into frictional engagement before any longitudinal movement of said casing and post toward each other takes place, interior portions of said spring bearing on said casing and post at respectively opposite sides thereof to bias the same laterally toward each other whereby said shoulders are held in engaging relation.

KEITH WILLIAMS.

REFERENCES CITED

The following references are of record in the file of this patent:

UNITED STATES PATENTS

| Number | Name | Date |
|---|---|---|
| 2,379,078 | Haseltine | June 26, 1945 |
| 2,416,691 | Haseltine | Mar. 4, 1947 |
| 2,426,684 | Haseltine | Sept. 2, 1947 |
| 2,439,937 | Krob | Apr. 20, 1948 |
| 2,532,358 | Dath | Dec. 5, 1950 |
| 2,558,116 | Withall | June 26, 1951 |